Jan. 21, 1969 H. W. KOMPANEK 3,423,543

LOUDSPEAKER WITH PIEZOELECTRIC
WAFER DRIVING ELEMENTS
Filed June 24, 1965

INVENTOR.
HARRY W. KOMPANEK
BY HIS ATTORNEYS
HARRIS, KIECH, RUSSELL & KERN

United States Patent Office 3,423,543
Patented Jan. 21, 1969

3,423,543

LOUDSPEAKER WITH PIEZOELECTRIC WAFER DRIVING ELEMENTS

Harry W. Kompanek, 153 Rametto Road, Santa Barbara, Calif. 93103

Filed June 24, 1965, Ser. No. 466,599
U.S. Cl. 179—110 10 Claims
Int. Cl. H04r 15/00

ABSTRACT OF THE DISCLOSURE

A loudspeaker comprising a driven member and a plurality of piezoelectric wafers distributed on and secured to a surface of the driven member and means for electrically energizing the wafers. Speakers with flat plate and conical driven members. A speaker comprising a room wall with a plurality of piezoelectric wafers adhered thereto.

This invention relates to a loudspeaker and more particularly to a loudspeaker driven by piezoelectric means.

As is well known, a piezoelectric wafer such as a barium titanate ceramic, produces an electric voltage when it is mechanically deformed. Conversely, when an A.C. voltage is applied across the wafer, the wafer is mechanically deformed and tends to cup. When the piezoelectric wafer is secured to a member such as a plate and an A.C. voltage is applied across the wafer, the wafer causes the entire plate to cup back and forth and to produce sound. As the characteristics of the deformations or vibrations in the plate depend upon the characteristics of the voltage applied across the piezoelectric wafer, sound of substantially any frequency and quality may be reproduced and hence the wafer and plate member serve as a loudspeaker.

An object of this invention is to provide a loudspeaker utilizing a plurality of piezoelectric wafers to drive a member to produce sound. Another object of this invention is to utilize a plurality of piezoelectric wafers to drive a generally flat plate. For example, the generally flat plate could have a painting secured to one side thereof and the piezoelectric wafers distributed on the opposite side. The plate could then be hung from the wall to serve as a support for the painting and as a loudspeaker.

Another object of this invention is to provide a small speaker having a wide frequency range and good quality.

A further object of this invention is to provide a loudspeaker in which the entire wall of a room is driven, thus providing excellent bass response. According to one object of this invention, the entire wall of a room is driven by securing to the wall a plate carrying piezoelectric means. The piezoelectric means drives the plate and the plate in turn drives the entire wall of the room. According to another object of this invention the entire wall of the room is driven by securing a plurality of piezoelectric wafers directly thereto.

Still another object of this invention is to provide a loudspeaker which is of simple construction and inexpensive to manufacture. The only elements required for construction of the loudspeaker are the driven member, piezoelectric means secured to the driven member, appropriate electrical connections between the piezoelectric means, and an amplifier. According to another object of the invention, construction of the loudspeaker is further simplified by utilizing a plurality of piezoelectric wafers connected in parallel.

A specific object of this invention is to provide a loudspeaker including a conductive plate having a relatively broad surface; a plurality of driving elements distributed along the relatively broad surface, each of the driving elements including a thin piezoelectric wafer having generally opposed first and second faces, a first conductive layer secured to the first face, and a second conductive layer secured to the second face; a conductive adhesive for securing the second conductive layer of each of the driving elements to the conductive plate; means for electrically connecting the amplifier output to the conductive plate and to the first layer of one of the driving elements; and means for electrically connecting the first conductive layer of said one driving element to the first conductive layers of the other of the driving elements.

The invention, both as to its organization and method of operation, together with further objects and advantages thereof, may best be understood by reference to the following description taken in connection with the accompanying drawing in which.

Figure 1:
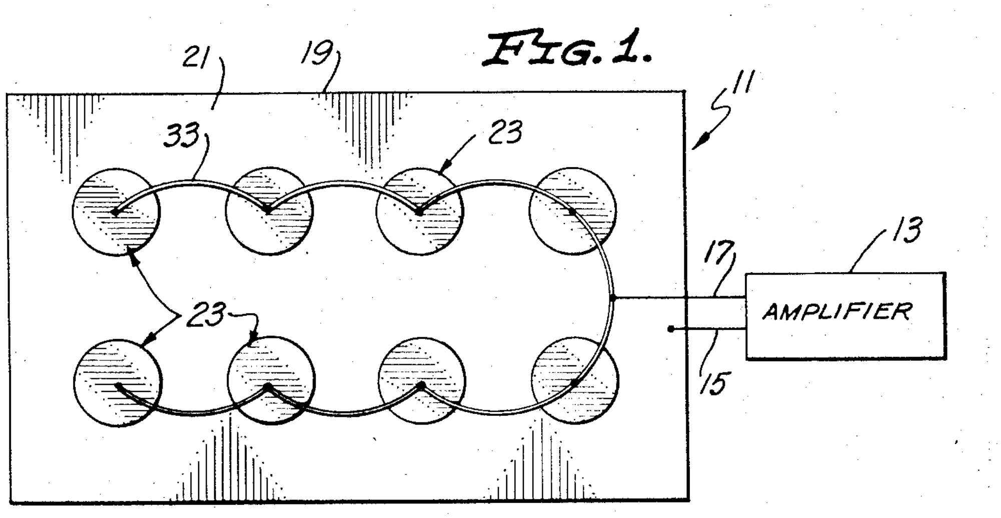
FIG. 1 is a schematic plan view of a preferred form of loudspeaker with an amplifier connected thereto.

Referring to the drawing and in particular to FIG. 1 thereof, reference numeral 11 designates a preferred form of loudspeaker electrically connected to an amplifier 13 by two amplifier leads 15 and 17. The loudspeaker 11 includes a conductive rectangular plate or driven element 19 having a relatively broad surface 21. The plate 19 is preferably made of a conductive metal such as steel but may be a non-conductor such as plastic or paper with a conductive layer thereon forming the surface 21. The plate 19 may be relatively small and still provide good quality sound. By way of illustration, in one specifiic embodiment the plate 19 was constructed of steel and was approximately 6″ x 10″ x 1⁄32″ and provided a speaker having a wide frequency range and good quality.

Figure 2:
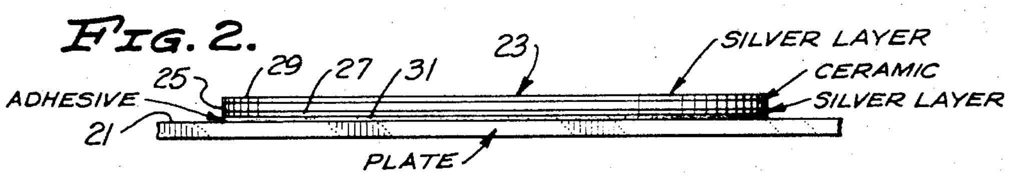
FIG. 2 is a fragmentary elevation showing one of the driving elements of the loudspeaker secured to a plate member.

A plurality of driving elements 23, eight being shown, is distributed on the relatively broad face 21 and the elements are preferably substantially equally spaced therealong. As shown in FIG. 2, each of the driving elements 23 includes a thin piezoelectric wafer 25 having generally opposed upper and lower faces, an upper conductive layer 29 secured to the upper face of the wafer, and a lower conductive layer 27 secured to the lower face of the wafer. The piezoelectric wafer may be of various sizes and assume a plurality of different shapes. Typical piezoelectric materials include barium titanates and lead zirconate-lead titanate mixtures. By way of illustration, a lead zirconate-lead titanate ceramic wafer of about 1 to 1½ inches in diameter and only a few thousandths of an inch thick has been found particularly advantageous. A single-wafer driving element is normally used, but two or more wafers may be affixed together to form a multilayer element if desired.

The conductive layers 27 and 29 are preferably very thin and assume substantially the same shape as the piezoelectric wafer 25 which is sandwiched therebetween. The conductive layers 27 and 29 may be secured to the wafer 25 in any suitable manner such as by a fired frit of a glass and conductive metal mixture.

Each of the driving elements 23 is secured to the broad surface 21 of the plate 19 by a thin layer of conductive adhesive 31 such as a conducting epoxy cement. As shown in FIG. 2, the adhesive 31 bonds the lower layer 27 to the surface 21 of the plate 19.

To faciliate construction and reduce the cost of manufacture, it is preferred to connect the driving elements 23 in parallel. A series connection or various series-parallel connections can be used to provide different load impedances. With the driving elements 23 arranged as shown in FIG. 1, the conductive plate 19 provides electrical connecting means between all of the layers 27 of the driving elements. Thus, to complete the parallel connection it is only necessary to provide a conductor 33 for connecting the upper layers 29 of each of the driving elements 23. The conductor 33 which is illustrated diagrammatically in FIG. 1 may be any suitable conductive means which can be easily secured to the driving elements 23 and which will provide a good electrical connection therebetween. The plate 19 may be mounted to any suitable supporting structure such as a conventional speaker box, or a frame around the edges, or a strip along one edge, or a central port, or the like (not shown). It is preferred to secure the plate 19 to such supporting structure continuously along the edges thereof.

With the plate 19 properly mounted, one output lead 15 from the amplifier 13 may be secured to the conductive plate 19 and the other output lead 17 may be secured to the conductor 33. By applying an A.C. voltage from the amplifier 13 to the driving elements 23, the wafers 25 are mechanically deformed or cupped, the character of the deformation being a function of the A.C. signal received from the amplifier. Such deformation of the wafers 25 causes the entire plate 19 to cup back and forth or to vibrate and produce a sound which is a function of the signal received from the amplifier 13. The loudspeaker 11 although very small and of simple construction has a wide frequency range and produces sound of high quality.

The loudspeaker may be oriented as desired. One possible arrangement would be to suspend the plate 19 from the wall of a room with a supporting structure in the form of a picture frame and with the driving elements 23 facing such wall. A printing or other decoration could then be secured to the side of the plate 19 which faces the interior of the room. The loudspeaker 11 would then serve both as a loudspeaker and as a support for a decoration or ornament.

Figure 3:
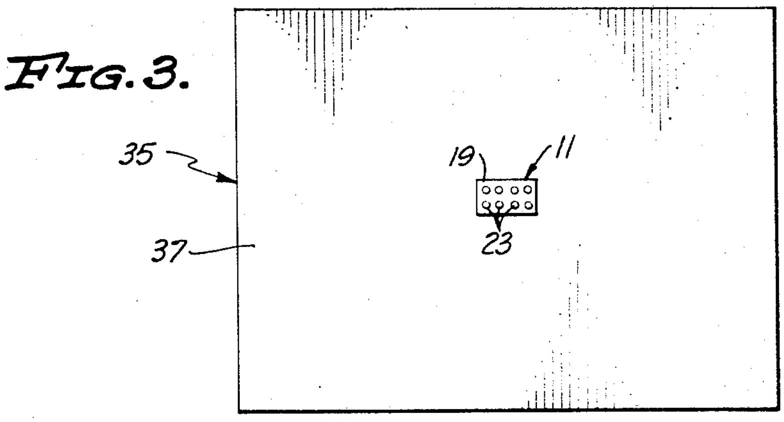
FIG. 3 shows another embodiment of the loudspeaker of this invention.

FIG. 3 illustrates a loudspeaker 35 which can be used to drive an entire wall of a room, thereby providing excellent bass response. The loudspeaker 35 includes the loudspeaker 11 (FIG. 1) rigidly mounted to a wall 37 for a typical room which is adapted for human occupancy. As shown in FIG. 3, the loudspeaker 11 is preferably centrally positioned on the wall 37. The driving elements 23 may face outwardly into the interior of the room as illustrated or may be on the opposite surface of the wall or panel. The wall 37 may be of any conventional construction and may be of the type typically found in a dwelling.

By driving the driving elements 23 in the manner indicated above in connection with FIGS. 1 and 2, both the plate 19 and the wall 37 are driven thereby providing a loudspeaker having excellent bass response. Thus, the entire wall of the room becomes the driven element of the speaker. If desired, the driven elements 23 or the wafers 25 could be directly secured to the wall 37, thereby eliminating the conductive plate 19. In this instance, the wall 37 becomes the member with a relatively broad surface.

Figure 4:
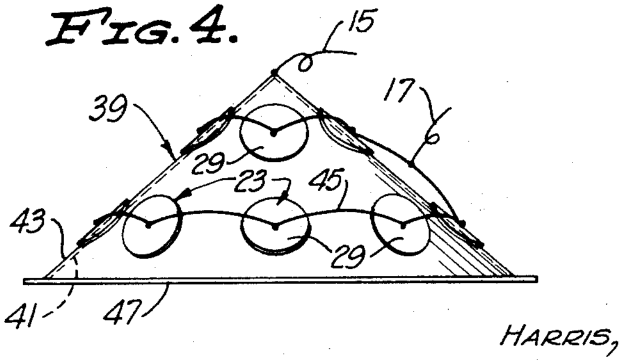
FIG. 4 shows a third embodiment of a loudspeaker constructed in accordance with the teachings of this invention.

Still another embodiment of the invention is illustrated in FIG. 4 wherein a loudspeaker 39 includes a hollow cone member 41 having a relatively broad surface 43 and a plurality of driving elements 23 secured to the broad surface. The driving elements 23 illustarted in FIG. 4 are identical in every way to the driving elements 23 shown in FIG. 1 and are secured to the cone member 41 by a conductive adhesive (not shown) such as epoxy cement. The cone member 41 may be constructed of paper, plastic, or a metal. If the cone member 41 is constructed of a nonconductive material such as paper, it is preferred to form the broad surface 43 of a conductive material to facilitate connecting of the driving elements 23 in parallel. A conductor 45 connects the upper conductive layers 29 of the driving elements 23 and is adapted to be connected to the lead 17 from an amplifier. The surface 43 of the cone member 41 is adapted for connection to the amplifier lead 15.

The loudspeaker of FIG. 4 may be mounted in any conventional manner, as by clamping around the rim 47, and the piezoelectric wafers 25 of the driving elements 23 will cause the speaker to produce sound in the same manner as described above in connection with FIGS. 1–3. The loudspeaker of FIG. 4 has the advantage of possessing the conventional cone shape and is therefore readily adaptable for use in conventional speaker boxes.

Many changes, modifications, and substitutions may be made by those having ordinary skill in the art without necessarily departing from the spirit and scope of this invention.

What is claimed is:

1. In a loudspeaker connectible to an amplifier having output leads, the combination of:
- a member having a relatively broad surface;
- a plurality of piezoelectric wafers having opposed faces and distributed on said relatively broad surface;
- means for securing substantially an entire face of each of said piezoelectric wafers to said relatively broad surface; and
- means for connecting said piezoelectric wafers to said output leads of the amplifier to drive said wafers in phase, said wafers when driven by the amplifier structurally deforming said member and producing sound.

2. A combination as defined in claim 1 wherein said member is a hollow cone and said relatively broad surface is generally conical.

3. A combination as defined in claim 1 wherein said member is a generally thin flat plate.

4. In a loudspeaker connectible to an amplifier having output leads, the combination of:
- a member having a relatively broad surface;
- a plurality of piezoelectric wafers having opposed faces and distributed along said relatively broad surface, each of said wafers comprising a single layer of piezoelectric material;
- means for securing substantially an entire face of each of said piezoelectric wafers to said relatively broad surface;
- means for electrically connecting said piezoelectric wafers in phase; and
- means for electrically connecting said piezoelectric wafers to the output leads of the amplifier.

5. In a loudspeaker connectible to an amplifier having two output leads, the combination of:
- a member having a relatively broad conductive surface;
- a plurality of driving elements distributed along said conductive surface, each of said driving elements including a piezoelectric wafer having a conductive layer over a portion of the surface thereof;
- means for securing substantially the entire conductive layer of each of said driving elements to said member;
- means for electrically connecting one of the leads from the amplifier to said conductive surface; and
- means for electrically connecting the other of the leads from the amplifier to said piezoelectric wafers.

6. A combination as defined in claim 5 wherein each of said piezoelectric wafers has a generally flat face to which said conductive layer is secured and said means for securing includes a conductive adhesive material.

7. In a loudspeaker connectible to an amplifier having two output leads, the combination of:
- a conductive plate having a relatively broad surface;
- a plurality of driving elements distributed along said relatively broad surface, each of said driving elements including a thin piezoelectric wafer having generally opposed first and second faces, a first conductive layer secured to said first face, and a second conductive layer secured to said second face, said piezoelectric wafer being sandwiched between said conductive layers;

means for securing substantially the entire second conductive layer of each of said driving elements to said conductive plate;

means for electrically connecting one of the leads from the amplifier to said conductive plate;

means for electrically connecting the other of the leads from the amplifier to said first layer of one of said driving elements; and conductive means for electrically connecting the first conductive layer of said one driving element to the first conductive layers of the other of said driving element.

8. In a loudspeaker connectible to an amplifier having output leads, the combination of:

a room having an inwardly facing wall and adapted for human occupancy;

a plate member having first and second generally opposed surfaces, said first surface being secured to said wall and said second surface facing generally inwardly in said room, said second surface being of no greater area than said wall;

piezoelectric wafer means on said plate member, said wafer means having opposed faces;

means for securing substantially an entire face of said piezoelectric wafer means to said second surface; and means for connecting said piezoelectric wafer to the output leads of the amplifier.

9. The combination as defined in claim 8 wherein said piezoelectric wafer means includes a plurality of piezoelectric wafers connected in parallel.

10. In a loudspeaker connectible to an amplifier having output leads, the combination of:

a room having an inwardly facing wall and adapted for human occupancy;

a plurality of piezoelectric wafers distributed along said wall, said wafers having opposed faces;

means for securing substantially an entire face of each of said wafers to said wall; and means for electrically connecting said wafers to the output leads of the amplifier.

References Cited

UNITED STATES PATENTS

| | | | |
|---|---|---|---|
| 3,366,748 | 1/1968 | Ashworth | 179—115 |
| 2,341,275 | 2/1944 | Holland | 179—115.5 |
| 2,895,062 | 7/1959 | Abbott | 179—110 |
| 2,911,484 | 11/1959 | Spitzer | 179—10 |
| 3,311,712 | 3/1967 | Cain | 179—113 |

KATHLEEN H. CLAFFY, *Primary Examiner.*

A. McGILL, *Assistant Examiner.*